US012705048B2

(12) United States Patent
Lee

(10) Patent No.: US 12,705,048 B2
(45) Date of Patent: Aug. 11, 2026

(54) METHOD OF DIFFERENCE UPDATE AND A SYSTEM THEREOF

(71) Applicant: HYUNDAI AUTOEVER CORP., Seoul (KR)

(72) Inventor: Deok Joo Lee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 243 days.

(21) Appl. No.: 18/541,427

(22) Filed: Dec. 15, 2023

(65) Prior Publication Data

US 2024/0201981 A1 Jun. 20, 2024

(30) Foreign Application Priority Data

Dec. 19, 2022 (KR) ........................ 10-2022-0178150

(51) Int. Cl.
*G06F 8/658* (2018.01)
*G06F 8/71* (2018.01)

(52) U.S. Cl.
CPC ................ *G06F 8/658* (2018.02); *G06F 8/71* (2013.01)

(58) Field of Classification Search
CPC ... G06F 8/658; G06F 8/71; G06F 8/65; G06F 8/60; G06F 8/70
USPC .......................................................... 717/170
See application file for complete search history.

(56) References Cited

U.S. PATENT DOCUMENTS 11,693,635 B1 * 7/2023 Sahar ...................... G06N 20/00 717/143
2004/0152455 A1 * 8/2004 Herle ...................... G06F 8/658 455/418
2019/0095187 A1 * 3/2019 Benedek ............ G06F 9/44521
2021/0141634 A1 5/2021 Jeong

FOREIGN PATENT DOCUMENTS

CN 113590168 A * 11/2021 ............. G06F 8/658
KR 200357938 Y1 7/2004
KR 20210041972 A 4/2021
KR 20210057619 A 5/2021
KR 20220086230 A 6/2022
WO WO-2020082984 A1 * 4/2020 ............. G06F 8/658

OTHER PUBLICATIONS

Guo et al., English translation copy, CN 202110861904 A, (Year: 2021).*
Yu et al., English translation copy, WO 2020082984 A1, (Year: 2020).*
Office Action cited in Korean patent application No. 10-2022-0178150; Aug. 27, 2024; 12 pp.

* cited by examiner

*Primary Examiner* — Bradley A Teets
*Assistant Examiner* — Zengpu Wei
(74) *Attorney, Agent, or Firm* — Lempia Summerfield Katz LLC

(57) ABSTRACT

A method performed by a mobile embedded system including a management controller and an execution controller. The method comprises generating, by the management controller, difference data based on a data difference between a first partition and a second partition of a memory provided in the execution controller, downloading, by the execution controller, the generated difference data, and performing, by the execution controller, an update of the execution controller using the downloaded difference data.

8 Claims, 9 Drawing Sheets

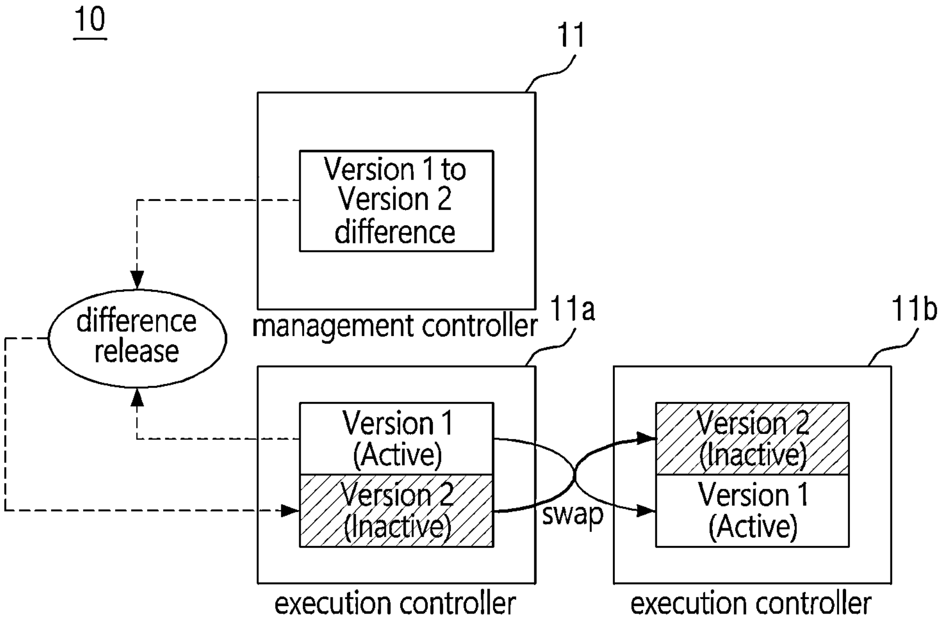
FIG. 1 “PRIOR ART”

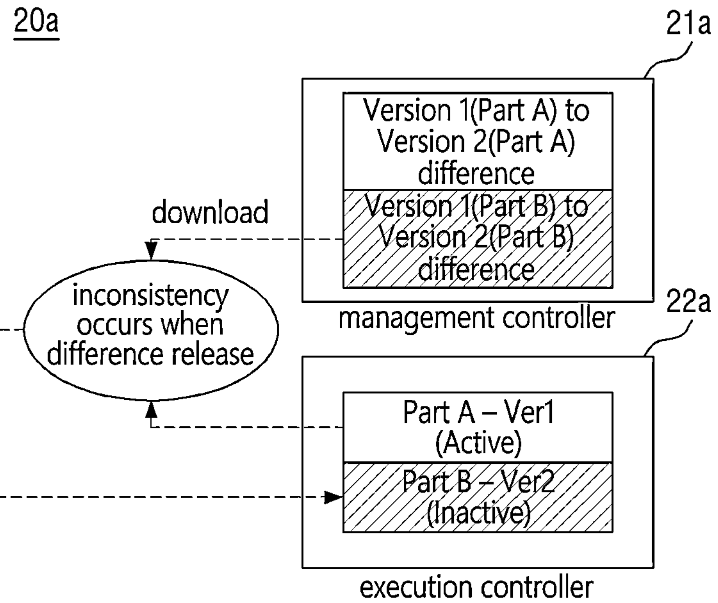
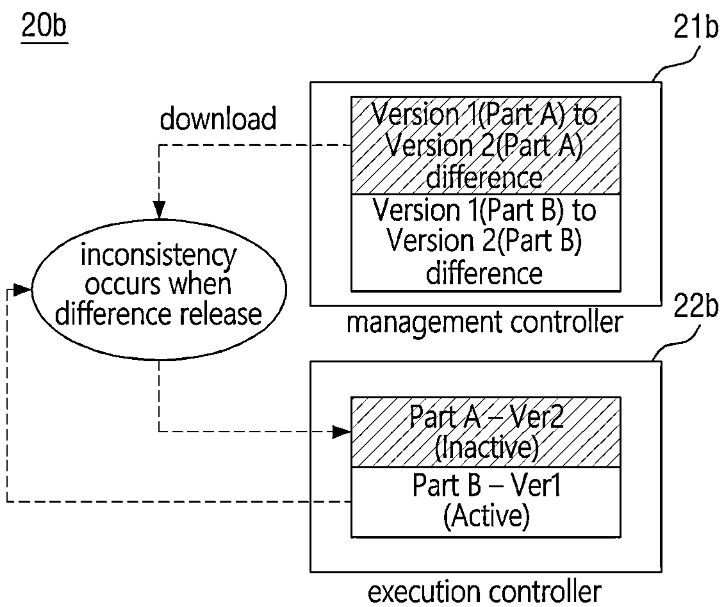
FIG. 2 “PRIOR ART”

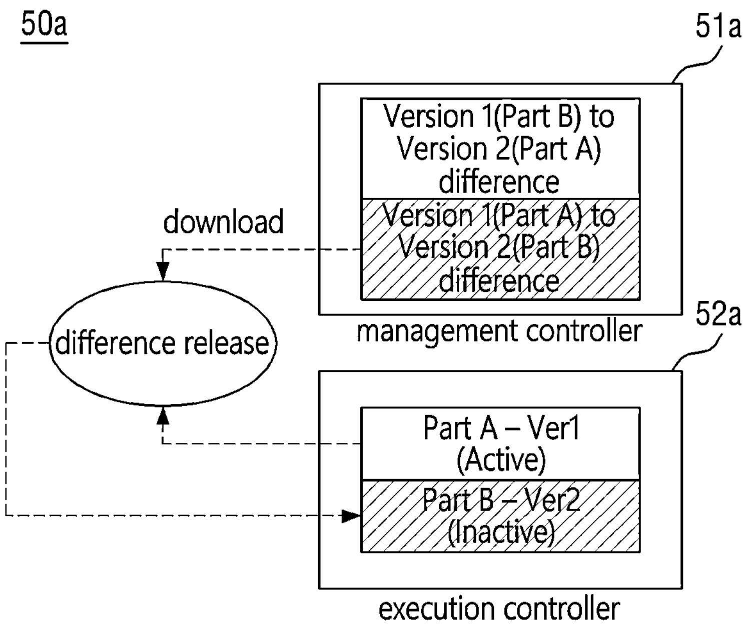
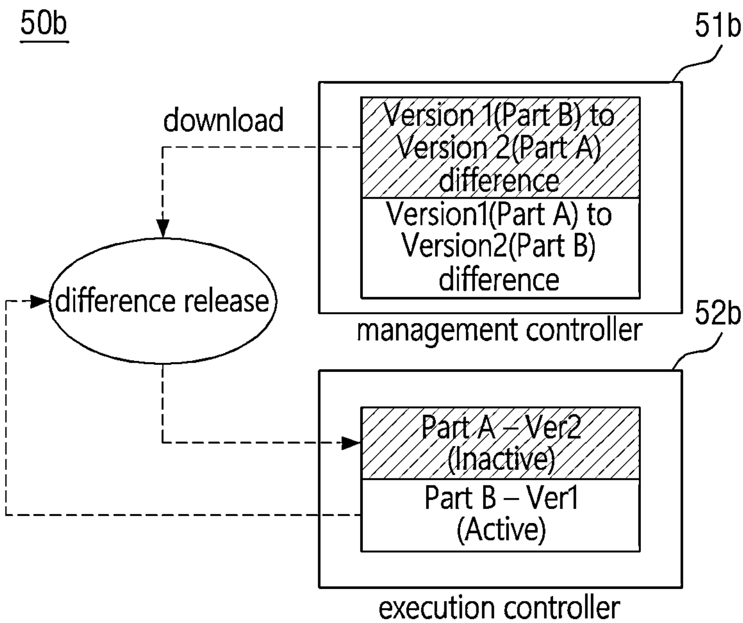
FIG. 6

METHOD OF DIFFERENCE UPDATE AND A SYSTEM THEREOF

CROSS-REFERENCE TO RELATED APPLICATION

This application claims the benefit of and priority to Korean Patent Application No. 10-2022-0178150, filed on Dec. 19, 2022, the entire contents of which are incorporated herein by reference.

BACKGROUND

1. Field

This disclosure relates to a difference update method and a system to which the method is applied. More specifically, it relates to a difference update method of a controller and a mobile embedded system including a controller to which the method is applied.

2. Description of the Related Art

In order to control various electronic devices of a vehicle, update technology for the software of the vehicle controller (microcontroller unit) is required. Currently, Over-the-Air (OTA) update technology that can wirelessly update the software of a vehicle controller is being developed. Similar to a smartphone update, an OTA update can be performed in a way that the vehicle's management controller downloads an update file from the server, and each execution controller downloads the update file from the management controller and performs the update.

As the update file data capacity of vehicle software gradually increases, difference update technology or redundant update technology can be used as a way to reduce the capacity of transmission data. In the OTA update of the vehicle controller, the controller update method may be different depending on whether the controller includes a memory management unit (MMU).

FIG. 1 is a diagram illustrating a redundant difference update method of an MMU type controller.

A vehicle embedded system 10 including MMU type controllers is shown. The vehicle embedded system 10 may include a management controller 11 and an execution controller 11*a*.

The management controller 11 may download the update data of the second version (the latest version) from the server, and use the update data of the first version, which is the previously stored current update version of the execution controller 11*a*, and the downloaded update data of the second version to generate difference data (Version 1 to Version 2 difference) and transmit it to the execution controller 11*a*.

The execution controller 11*a* may download the difference data from the management controller 11. Here, difference data may be downloaded to the inactive area of the memory of the execution controller 11*a*. After difference data is downloaded to the inactive space as described above, the physical addresses and virtual addresses of the active area and inactive area of the memory can be swapped in hardware by the MMU. Through hardware swap, difference data is mapped to the same address, so difference release can be performed with the same update data even while the execution controller is operating. Here, difference release may mean updating the execution controller using difference data.

FIG. 2 is a diagram illustrating an embodiment, in which inconsistency occurs during a redundant difference update of an MMU-less type controller.

In the case of an execution controller that does not include an MMU, partitions of the memory provided in the execution controller may be divided for redundant updates. In FIG. 2, the memory partition of the execution controller may be divided into partition A (Part A) and partition B (Part B).

First, an MMU-less type vehicle embedded system 20*a* including an execution controller 22*a* with partition A running is shown.

The management controller 21*a*, among previously generated difference data of the first and second versions for the partition A (Part A—Version 1 to Part A—Version 2 difference) and previously generated difference data of the first and second versions for the partition B (Part B—Version 1 to Part B—Version 2 difference), may confirm that partition A of the memory of the execution controller 22*a* is running and transmit the difference data for partition B to the execution controller 22*a*.

The execution controller 22*a* can download difference data for partition B and perform difference release. However, in this case, since the execution controller 22*a* does not include an MMU, the mapped addresses of partition A and partition B of the memory do not match, so data of the second version of the partition to be updated cannot be extracted.

Likewise, for the execution controller 22*b* in which partition B is running, when difference data for partition A is downloaded from the management controller 21*b* and the difference is released, the mapped addresses of partition A and partition B do not match, so the data of the second version of the partition to be updated cannot be extracted.

As described above, the redundant difference update method is not currently applied to the MMU-less type controller. However, as vehicle functions become more complex, the update capacity of the software mounted on the vehicle increases. In updating the vehicle controller, technology is required to reduce the update data transmission capacity and thereby shorten the update time.

SUMMARY

Aspects of the present disclosure provide a redundant difference update method and system for a controller that does not include an MMU.

Aspects of the present disclosure provide a method to reduce update data transmission capacity and shorten update time.

Aspects of the present disclosure provide a method and system that can update the controller in real-time even when the controller is running.

Aspects of the present disclosure provide an efficient OTA update method for a vehicle embedded system that does not include an MMU.

Aspects of the present disclosure provide an efficient update method for a mobile embedded system that does not include an MMU.

However, aspects of the present disclosure are not restricted to those set forth herein. The above and other aspects of the present disclosure should become more apparent to one of ordinary skill in the art to which the present disclosure pertains by referencing the detailed description of the present disclosure given below.

According to an aspect of the present disclosure, a method performed by a mobile embedded system includes a management controller and an execution controller. The method may comprise: generating, by the management controller, difference data based on a data difference between a first partition and a second partition of a memory provided in the execution controller; downloading, by the execution controller, the generated difference data; and performing, by the execution controller, an update of the execution controller using the downloaded difference data.

In some embodiments, generating of the difference data comprises: generating first difference data based on data of the first partition of a second version and data of the second partition of a first version; and generating second difference data based on data of the first partition of a first version and data of the second partition of a second version.

In some embodiments, the method may further comprise: checking an updated version of the execution controller and a running partition of the memory of the execution controller; and when the running partition of the memory is confirmed to be the first partition, updating the execution controller to a second version using the generated second difference data.

In some embodiments, the method may further comprise: checking an updated version of the execution controller and a running partition of the memory of the execution controller; and when the running partition of the memory is confirmed to be the second partition, updating the execution controller to a second version using the generated first difference data.

In some embodiments, wherein a data difference between the first partition and the second partition means a difference in mapped address information between the first partition and the second partition.

In some embodiments, the execution controller is an MMU-less type controller.

According to another aspect of the present disclosure, a method performed by a mobile embedded system includes a management controller and an execution controller. The method may comprise: when a first partition of a first version of a memory provided in the execution controller is running, performing, by the execution controller, difference release using first partition data of a first version and second difference data extracted from the running first partition. In particular, the second difference data is generated based on previously generated data of a first partition of a first version and data of a second partition of a second version.

In some embodiments, the method may further comprise: when the second partition of a first version of the memory provided in the execution controller is running, performing, by the execution controller, difference release using second partition data of a first version and first difference data extracted from the running second partition. In particular, the first difference data is generated based on previously generated data of the second partition of a first version and data of the first partition of a second version.

According to another aspect of the disclosure, a mobile embedded system includes a management controller and an execution controller. The management controller generates difference data based on a data difference between a first partition and a second partition of the memory provided in the execution controller. In particular, the execution controller downloads the generated difference data and performs an update of the execution controller using the downloaded difference data.

In some embodiments, the generated difference data comprises: first difference data based on data of a second partition of a first version and data of a first partition of a second version, and second difference data based on data of a first partition of a first version and data of a second partition of a second version.

In some embodiments, an updated version of the execution controller and a running partition of a memory of the execution controller are checked. When the running partition of the memory is confirmed to be the first partition, the execution controller is updated to a second version using the generated second difference data.

In some embodiments, an updated version of the execution controller and a running partition of the memory of the execution controller are checked. When the running partition of the memory is confirmed to be the second partition, the execution controller is updated to a second version using the generated first difference data.

In some embodiments, a data difference between the first partition and the second partition means a difference in mapped address information between the first partition and the second partition.

In some embodiments, the execution controller is a MMU-less type controller.

BRIEF DESCRIPTION OF THE DRAWINGS

These and/or other aspects should become apparent and more readily appreciated from the following description of embodiments, taken in conjunction with the accompanying drawings in which:

FIG. 1 is a diagram illustrating a redundant difference update method of a MMU-type controller;

FIG. 2 is a diagram illustrating an embodiment in which inconsistency occurs during a redundant difference update of a MMU-less type controller;

FIGS. 6 and 7 are diagrams for explaining in more detail the difference data generation method and difference update method described with reference to FIGS. 4 and 5;

DETAILED DESCRIPTION

Figure 3:
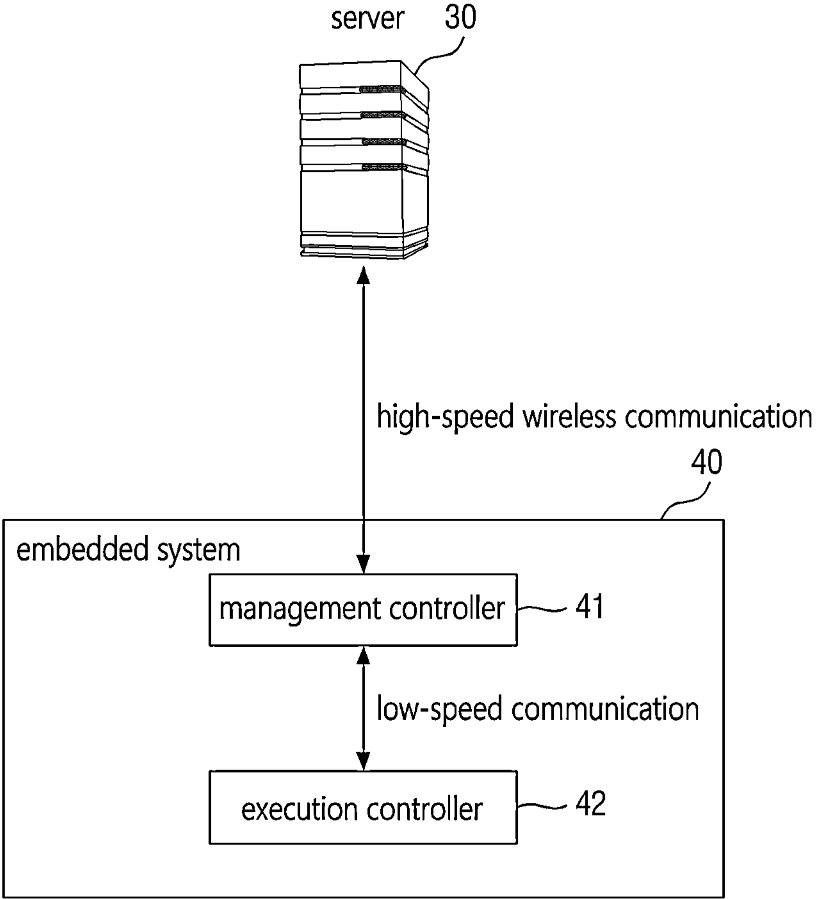
FIG. 3 is a configuration diagram of an embedded system for difference update according to an embodiment of the present disclosure.

Hereinafter, embodiments of the present disclosure are described with reference to the attached drawings. Advantages and features of the present disclosure and methods of accomplishing the same should be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure is thorough and complete and fully conveys the concept of the disclosure to those of ordinary skill in the art, and the present disclosure is only defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof is omitted.

Unless otherwise defined, all terms used in the present specification (including technical and scientific terms) may be used in a sense that can be commonly understood by those of ordinary skill in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase. When a component, device, element, or the like of the present disclosure is described as having a purpose or performing an operation, function, or the like, the component, device, or element should be considered herein as being "configured to" meet that purpose or to perform that operation or function.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component. When a component, device, element, or the like, of the present disclosure, is described as having a purpose or performing an operation, function, or the like, the component, device, or element should be considered herein as being "configured to" meet that purpose or to perform that operation or function.

Hereinafter, embodiments of the present disclosure are described with reference to the attached drawings.

FIG. 3 is a configuration diagram of an embedded system for difference update according to an embodiment of the present disclosure.

As shown in FIG. 3, the embedded system 40 may include a management controller 41 that communicates with the server 30 and the execution controller 42, and an execution controller 42 that communicates with the management controller 41. Here, the controller may be an Micro Controller Unit (MCU).

According to one embodiment, the embedded system 40 of the present disclosure may be a mobile embedded system. For example, the embedded system 40 may be an embedded system for a vehicle.

According to one embodiment, the embedded system 40 may be an MMU-less type embedded system that does not include a memory management unit (MMU). In other words, the execution controller 42 may be an MMU-less type execution controller that does not include an MMU. Here, the memory provided in the MMU-less type execution controller can be divided into partition A (Part A) and partition B (Part B).

The management controller 41 included in the embedded system 40 can communicate wirelessly with the server 30 that provides update data for Over-the-Air (OTA) difference update. The communication method between the server 30 and the management controller 41 of the present disclosure is not limited to this, and the server 30 and the management controller 41 may communicate using various known methods such as wired or wireless methods.

According to one embodiment, the management controller 41 may include an Android or Linux system based on a high-end application processor.

According to one embodiment, the management controller 41 may download update data from the server 30 and generate difference data using the downloaded update data and the previously stored update data.

For example, the management controller 41 may download the update data of the second version from the server 30, and use the downloaded update data of the second version and the previously stored update data of the first version to generate difference data (Version 1 to Version 2 difference) based on the data difference between the first version and the second version. Here, the pre-stored update data of the first version may be the update data of the first version downloaded from the server 30 in the past.

According to one embodiment, the management controller 41 may download the update data of the second version from the server 30, for the memory of the execution controller 42 of the first version divided into partition A and partition B, and use the downloaded update data of the second version, the previously stored data of partition A of the first version, and the previously stored data of partition B of the first version to generate first difference data based on the difference between the data of partition A of the second version and the data of the partition of the first version. The management controller 41 may generate second difference data based on the difference between the data of partition A of the first version and the data of partition B of the second version. Difference data corresponding to the inactive partition of the execution controller 42 of the first version may be transmitted to the execution controller 42.

The above-described method of generating of the first difference data and second difference data are described again with reference to FIGS. 4-7 below.

According to one embodiment, the management controller 41 may download the update data of the third version from the server 30, for the memory of the first execution controller (not shown) of the first version divided into partition A and partition B and the memory of the second execution controller (not shown) of the second version and generate difference data for all cases for the first to third versions.

The above-described method of generating difference data for all cases for the first to third versions are described again with reference to FIG. 8 below.

The execution controller 42 can electrically control specific parts of the embedded system 40 and perform a function of collecting specific information and providing the collected information to the driver or passenger.

According to one embodiment, the execution controller 42 may communicate with the management controller 41 according to a CAN, CAN-FD, LIN, or Ethernet communication protocol. However, the scope of the present disclosure is not limited thereto.

According to one embodiment, the management controller 41 may communicate with the server 30 through high-speed wireless communication, and the execution controller 42 may communicate with the management controller 41 through low-speed communication.

Note that each component of the embedded system shown in FIG. 1 represents functionally distinct functional elements, and that multiple components may be implemented in an integrated form in an actual physical environment. For example, at least some of the management controller 41 and the execution controller 42 may be implemented in the form of different logic within one physical computing device.

Additionally, in an actual physical environment, each of the above components may be implemented as separated into a plurality of detailed functional elements. For example, a first function of execution controller 42 may be implemented in a first computing device and a second function may be implemented in a second computing device.

So far, the embedded system and network environment for difference update according to an embodiment of the present disclosure have been described with reference to FIG. 3. Hereinafter, the difference update method according to various embodiments of the present disclosure is described in detail. In order to provide convenience of understanding, the description of the above method is continued assuming the environment shown in FIG. 3, but those of ordinary skill in the art should clearly understand that the environment in which difference updates are provided can be modified at any time.

Each step of the methods described below may be performed by a computing device. In other words, each step of the above methods may be implemented as one or more instructions executed by a processor of a computing device. All steps included in the methods may be performed by a single physical computing device, but the first steps of the method may be performed by a first computing device and the second steps of the method may be performed by a second computing device. In other words, each step of the method can be performed by a computing system. Hereinafter, unless otherwise specified, the description is continued assuming that each step of the above method is performed by the management controller 41 or the execution controller 42. However, for convenience of explanation, the description of the subject of each step included in the method may be omitted. In addition, in the methods described below, the execution order of each operation can be changed within the range where the execution order can be logically changed as needed.

Figure 4:
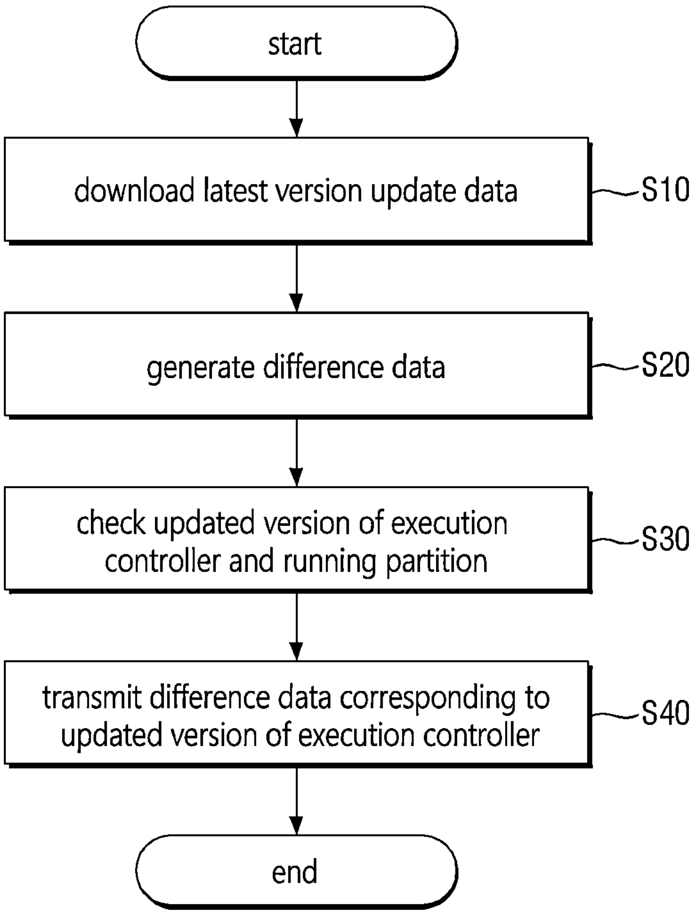
FIG. 4 is a flowchart illustrating a method of generating difference data according to another embodiment of the present disclosure.

FIG. 4 is a flowchart for explaining a method of generating difference data according to another embodiment of the present disclosure.

In step S10, the update data of the latest version may be downloaded from the server 30.

According to one embodiment, the downloaded update data of the latest version may be stored in the management controller 41.

In step S20, the management controller 41 may generate difference data using the downloaded update data of the latest version and the previously stored update data of the older version.

According to one embodiment, the management controller 41 may generate difference data based on the difference in address information data between partition A and partition B of the memory provided in the execution controller.

Hereinafter, with reference to FIG. 7, an method of generating difference data based on the address information data difference between partition A and partition B are described. Here, it is assumed that the older version is the first version and the latest version is the second version.

Figure 7:
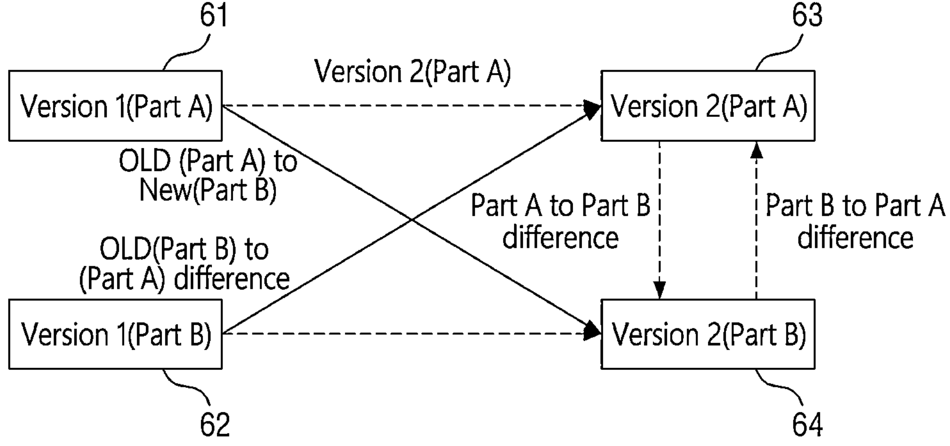

Referring to FIG. 7, the management controller 41 may generate data 61 of a first version for partition A, data 63 of a second version for partition A, data 62 of a first version for partition B, and the data 64 of a second version for partition B. Here, the data of the first version for partition A and the data of the first version for partition B may be pre-stored data or data previously downloaded from the server 30. In addition, the data of the second version for partition A and the data of the second version for partition B may be data downloaded from the server 30, and may be data generated using the update data of the latest version downloaded from the server 30.

According to one embodiment, the management controller 41 may generate difference data of the first and second versions for partition A (Part A—Version 1 to Part A—Version 2 difference) based on the data 61 of the first version for partition A and the data 63 of the second version for partition A. In addition, the management controller 41 may generate difference data of the first and second versions for partition B (Part B—Version 1 to Part B—Version 2 difference) based on the data 62 of the first version for partition B and the data 64 of the second version for partition B.

According to one embodiment, the management controller 41 may generate difference data (OLD (Part A) to New (Part B) difference) based on the data 61 of the first version of for partition A and the data 64 of the second version for partition B. Additionally, the management controller 41 may generate difference data (OLD (Part B) to New (Part A) difference) based on the data 62 of the first version of data 62 for partition B and the data 63 of the second version of data 63 for partition A.

According to one embodiment, the data difference between partition A and partition B may be a difference in mapped address information.

According to the above-described embodiments, difference data is generated using the difference between the address information data of the divided partition of the execution controller and the difference between the changed code data of the latest version and the old version, so that the execution controller later can perform difference release without data inconsistency by downloading the difference data corresponding to the partition of the memory that is not running. In other words, difference update may be possible without data inconsistency even while the execution controller is running.

Referring again to FIG. 4, in step S30, the management controller 41 can check the updated version of the execution controller 42 and information about the partition being running.

For example, when the embedded system 40 is provided with a first execution controller (not shown) and a second execution controller 42, the management controller 41 may check an updated version of the first execution controller and information about the partition being running, and the updated version of the second execution controller and information about the partition being running, respectively.

In step S40, the management controller may transmit difference data corresponding to the confirmed update version of the execution controller 42.

According to one embodiment, the transmitted difference data may be difference data previously generated according to the method previously described with reference to FIG. 7.

According to one embodiment, the management controller 41 may transmit difference data matching to each of the first and second execution controllers.

For example, it is assumed that the management controller 41 downloads update data of the latest version, that is the third version, from the server 30.

When the updated version of the first execution controller is the first version and partition A of the memory of the first execution controller is running, the management controller 41 may transmit difference data (Version 1 (Part B) to Version 3 (Part A) difference) to the first execution controller based on the data of the first version for partition A and the data of the third version for partition B.

Additionally, when the updated version of the second execution controller is the second version and partition B of the memory of the second execution controller is running, the management controller 41 may transmit difference data (Version 3 (Part A) to Version 2 (Part B) difference) to the second execution controller based on the data of the third version for partition A and the data of the second version for partition B.

Figure 5:
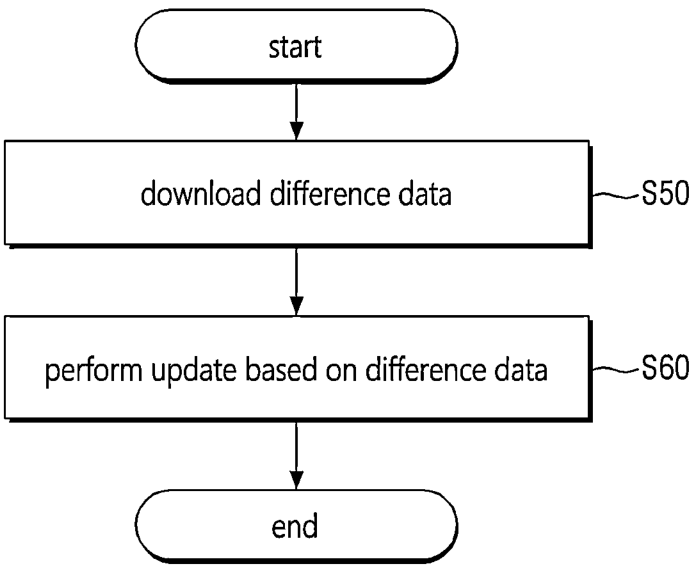
FIG. 5 is a flowchart illustrating a difference update method according to another embodiment of the present disclosure.

FIG. 5 is a flowchart for explaining a difference update method according to another embodiment of the present disclosure.

Referring to FIG. 5, in step S50, the execution controller 42 may download the difference data from the management controller 41.

According to one embodiment, the execution controller 42 may download matching difference data from the management controller 41 based on information about the partition being running in the memory provided in the execution controller 42.

In step S60, the execution controller 42 may update the execution controller 42 based on the downloaded difference data. Here, updating the execution controller 42 based on the difference data may mean performing difference release on the partition of the memory of the execution controller 42 that matches the difference data based on the difference data.

Hereinafter, with reference to FIG. 6, the difference data generation method and difference update method described with reference to FIGS. 4 and 5 are described in more detail.

Referring to FIG. 6, the management controller may first download update data from the server to generate difference data.

According to one embodiment, the management controller may download the update data of the second version from the server, for the memory of the execution controller of the first version divided into partition A and partition B, and generate first difference data based on the difference between the data of partition B of the first version and the data of partition A of the second version, and generate second difference data based on the difference between the data of partition A of the first version and the data of partition B of the second version.

Hereinafter, the embedded system 50*a* in which difference release is performed on the execution controller 52*a* in which partition A is running is described.

First, from the management controller 51*a*, in which the previously generated first difference data (Version 1 (Part B) to Version 2 (Part A) difference) and the previously generated second difference data (Version 1 (Part A) to Version 2 (Part B) difference) are stored, second difference data corresponding to partition B that is not running may be transmitted to the execution controller 52*a*.

In other words, the execution controller 52*a*, where partition A is running, may download the second difference data from the management controller 51*a* and perform the difference releases based on the data of the running partition (Partition A—Version 1) and the second difference data. Accordingly, an update of a partition (partition B) that is not running can be performed. As a result of the update, a partition that is not running can be updated to the second version (Part B (inactive)—Version 2).

According to one embodiment, the execution controller 52*a*, in which partition A is running, may download the second difference data from the management controller 51*a*, perform difference release between partition A data of the first version and the second difference data, and extract partition B data of the second version.

Difference release can be performed based on the data of the running partition (Partition A—Version 1) and the second difference data.

Hereinafter, the embedded system 50*b* in which difference release is performed on the execution controller 52*b* in which partition B is running is described.

First, from the management controller 51*b*, in which the previously generated first difference data (Version 1 (Part B) to Version 2 (Part A) difference) and the previously generated second difference data (Version 1 (Part A) to Version 2 (Part B) difference) are stored, first difference data corresponding to partition A that is not running may be transmitted to the execution controller 52*b*.

In other words, the execution controller 52*b*, where partition B is running, may download the first difference data from the management controller 51*b* and perform the difference release based on the data of the partition B being running (Partition B—Version 1) and the first difference data. Accordingly, an update of a partition (partition A) that is not running can be performed. As a result of the update, a partition that is not running can be updated to the second version (Part A (inactive)—Version 2).

According to one embodiment, the execution controller 52*b*, in which partition B is running, may download the first difference data from the management controller 5*ib*, perform difference release between partition B data of the first version and the first difference data, and extract partition A data of the second version.

According to the above-described embodiments, by generating difference data using the difference between the address information data of the divided partition of the execution controller and the difference between the changed code data of the latest version and the older version, the execution controller may download the difference data corresponding to the partition of the memory that is not running to perform difference release without data inconsistency. In other words, difference update may be possible without data inconsistency even while the execution controller is running.

Figure 8:
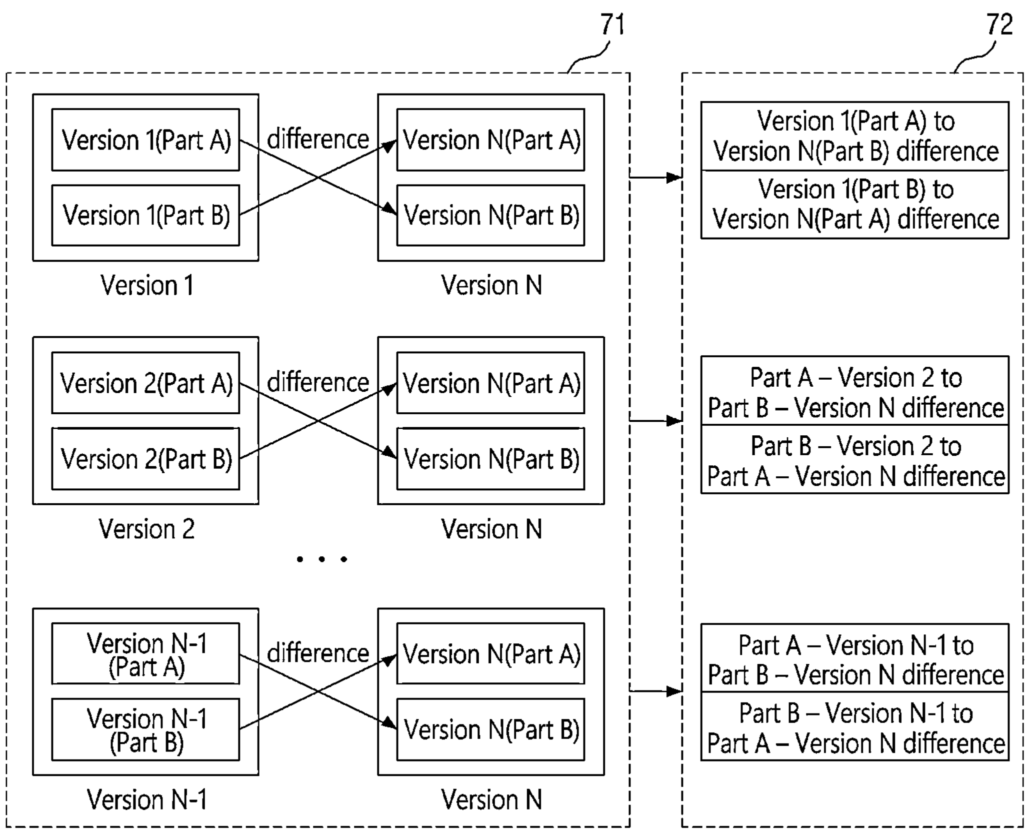
FIG. 8 is a diagram illustrating a method for generating a plurality of difference data in some embodiments of the present disclosure.

FIG. 8 is a diagram illustrating a method for generating a plurality of difference data in some embodiments of the present disclosure.

Referring to FIG. 8, a method of generating a plurality of difference data when the latest updated version of the embedded system 40 is the Nth version is shown (71).

According to one embodiment, the management controller 41 may download the update data of the Nth version from the server 30. Additionally, the management controller 41 can store and manage the previously downloaded update data of the first to N-lth versions.

The management controller 41 may generate difference data (Version 1 (Part A) to Version N (Part B) difference) based on the data of partition A of the first version and the data of partition B of the Nth version, and generate difference data (Version 1 (Part B) to Version N (Part A) difference) based on the data of partition B of the first version and the data of partition A of the Nth version.

In addition, the management controller 41 may generate difference data (Version 2 (Part A) to Version N (Part B) difference) based on the data of partition A of the second version and the data of partition B of the Nth version, and generate difference data (Version 2 (Part B) to Version N (Part A) difference) based on the data of partition B of the second version and the data of partition A of the Nth version.

In addition, the management controller 41 may generates difference data (Version N−1 (Part A) to Version N (Part B)

difference) based on the data of partition A of the N-lth version and the data of partition B of the Nth version, and generate difference data (Version N−1 (Part B) to Version N (Part A) difference) based on the data of partition B of the N-lth version and the data of partition A of the Nth version.

The difference data generated as above can be stored in the management controller 41 (72).

According to the above-described embodiment, a plurality of difference data can be generated according to the difference between the data of the divided partitions of the memory of the execution controller and the difference between the update data using the update data of the first version to the update data of the Nth version. Therefore, the update of the execution controller can be performed using the updated version of each execution controller and difference data corresponding to the partition that is not running.

Figure 9:
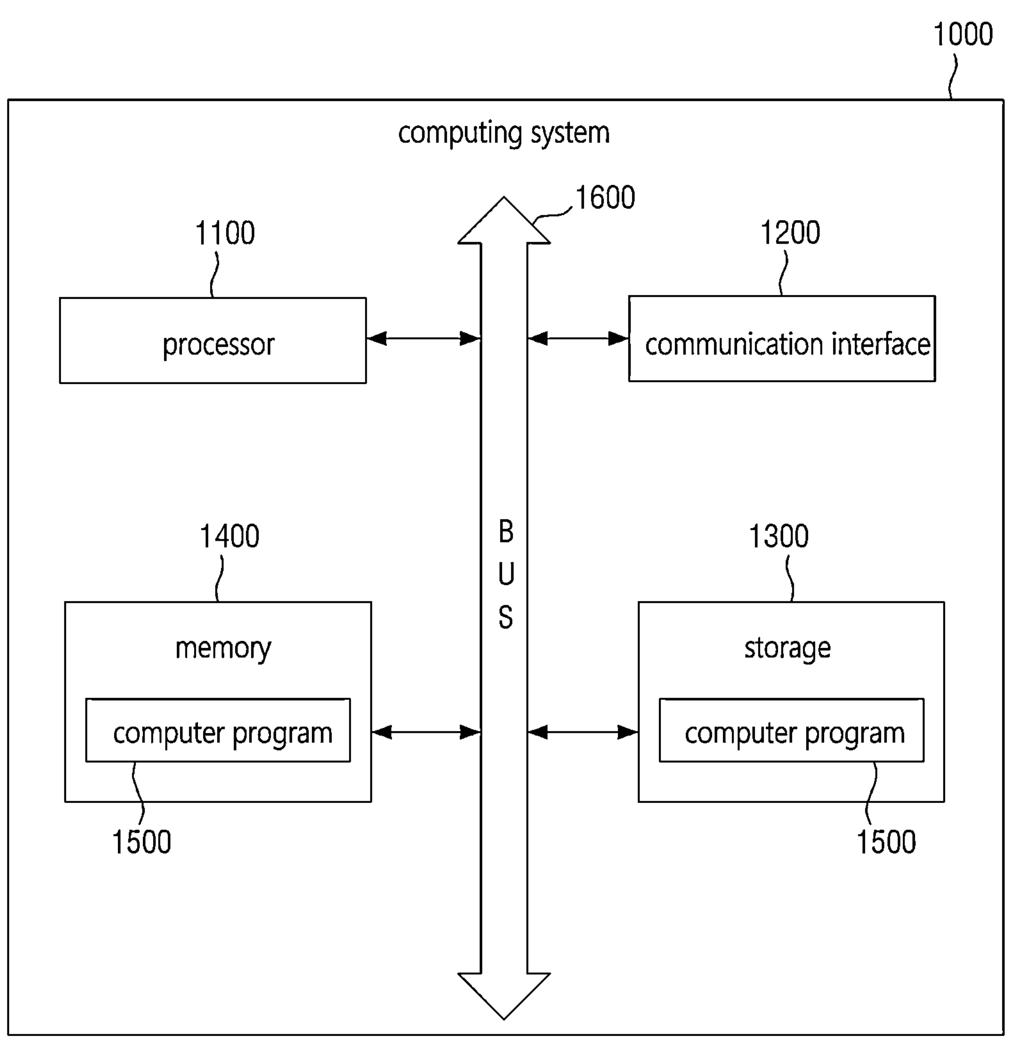
FIG. 9 is a hardware configuration diagram of a computing system according to some embodiments of the present disclosure.

FIG. 9 is a hardware configuration diagram of a computing system according to some embodiments of the present disclosure. The computing system 1000 shown in FIG. 9 may, for example, refer to a computing system including the management controller 41 described with reference to FIG. 3, and may refer to a computing system including the execution controller 42. The computing system 1000 may include one or more processors 1100, a system bus 1600, a communication interface 1200, a memory 1400 that loads a computer program 1500 executed by the processor 1100, and a storage 1300 that stores a computer program 1500.

The processor 1100 controls the overall operation of each component of the computing system 1000. The processor 1100 may perform operations on at least one application or program to execute methods/operations according to various embodiments of the present disclosure. The memory 1400 stores various data, instructions and/or information. The memory 1400 may load one or more computer programs 1500 from the storage 1300 to execute methods/operations according to various embodiments of the present disclosure. The bus 1600 provides communication functions between components of computing device 1000. The communication interface 1200 supports Internet communication of the computing system 1000. The storage 1300 may non-temporarily store one or more computer programs 1500. The computer program 1500 may include one or more instructions implementing methods/operations according to various embodiments of the present disclosure. When the computer program 1500 is loaded into the memory 1400, the processor 1100 can perform methods/operations according to various embodiments of the present disclosure by executing the one or more instructions.

In some embodiments, the computer program 1500 may include, for example, in a method performed by a mobile embedded system including a management controller and an execution controller, the instructions for performing the steps comprising generating, by the management controller, difference data based on a data difference between a first partition and a second partition of a memory provided in the execution controller, downloading, by the execution controller, the generated difference data, and performing, by the execution controller, an update of the execution controller using the downloaded difference data.

So far, a variety of embodiments of the present disclosure and the effects according to embodiments thereof have been mentioned with reference to FIGS. 1-9 The effects according to the technical idea of the present disclosure are not limited to the forementioned effects, and other unmentioned effects should be clearly understood by those of ordinary skill in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those of ordinary skill in the art should appreciate that many variations and modifications can be made to the embodiments without substantially departing from the principles of the present disclosure. Therefore, the disclosed embodiments of the disclosure are used in a generic and descriptive sense only and not for purposes of limitation.

What is claimed is:

1. A method performed by a mobile embedded system including a management controller and an execution controller, the method comprising:

generating, by the management controller, first difference data by using data of a first partition of a second version and data of a second partition of a first version, wherein a memory provided in the execution controller is divided by at least the first partition and the second partition;

downloading, by the execution controller, the first difference data; and performing, by the execution controller, an update of the first partition of the memory using the first difference data, wherein, during the update of the first partition, the second partition is executed and the first partition is not executed, and wherein the execution controller is a memory management unit (MMU)-less type controller.

2. The method of claim 1, further comprising:

generating, by the management controller, second difference data by using data of the first partition of the first version and data of the second partition of the second version;

downloading, by the execution controller, the second difference data; and performing, by the execution controller, an update of the second partition of the memory using the second difference data, wherein, during the update of the second partition, the first partition is executed and the second partition is not executed.

3. The method of claim 1, wherein a data difference between the first partition and the second partition means a difference in mapped address information between the first partition and the second partition.

4. A method performed by a mobile embedded system including a management controller and an execution controller, the method comprising:

when a first partition of a first version of a memory provided in the execution controller is running, performing, by the execution controller, difference release using first partition data of the first version and second difference data extracted from the running first partition, wherein the second difference data is generated based on previously generated data of the first partition of the first version and data of a second partition of a second version.

5. The method of claim 4, further comprising:

when the second partition of a first version of the memory provided in the execution controller is running, performing, by the execution controller, difference release using second partition data of first version and first difference data extracted from the running second partition, wherein the first difference data is generated based on previously generated data of the second partition of a first version and data of the first partition of a second version.

6. A mobile embedded system comprising: a management controller and an execution controller, wherein the management controller is configured to generate first difference data by using data of a first partition of a second version and data of a second partition of a first version, wherein a memory provided in the execution controller is divided by at least the first partition and the second partition, wherein the execution controller is configured to download the first difference data and perform an update of the first partition of the memory using the first difference data, wherein, during the update of the first partition, the second partition is executed and the first partition is not executed, and wherein the execution controller is a memory management unit (MMU)-less type controller.

7. The mobile embedded system of claim 6, further including:

wherein the management controller generates second difference data by using data of the first partition of the first version and data of the second partition of the second version, wherein the execution controller downloads the second difference data and performs an update of the second partition of memory using the second difference data, and wherein, during the update of the second partition, the first partition is executed and the second partition is not executed.

8. The system of claim 6, wherein a data difference between the first partition and the second partition means a difference in mapped address information between the first partition and the second partition.

* * * * *